(12) United States Patent
Aumercier et al.

(10) Patent No.: US 7,527,867 B2
(45) Date of Patent: May 5, 2009

(54) HYDROPHILIC REFLECTIVE ARTICLE

(75) Inventors: Laurent Aumercier, Brouviller (FR); Pierre-André Dreidemy, Remeling (FR)

(73) Assignee: AGC Flat Glass Europe SA, Brussels (BE)

( * ) Notice: Subject to any disclaimer, the term of this patent is extended or adjusted under 35 U.S.C. 154(b) by 362 days.

(21) Appl. No.: 10/531,094

(22) PCT Filed: Oct. 6, 2003

(86) PCT No.: PCT/EP03/50692

§ 371 (c)(1),
(2), (4) Date: Apr. 8, 2005

(87) PCT Pub. No.: WO2004/034105

PCT Pub. Date: Apr. 22, 2004

(65) Prior Publication Data

US 2006/0152832 A1    Jul. 13, 2006

(30) Foreign Application Priority Data

Oct. 10, 2002   (FR)  .................................. 02 12820

(51) Int. Cl.
*B32B 17/06* (2006.01)
(52) U.S. Cl. ...................... 428/428; 428/432; 428/697; 428/698; 428/699; 428/701; 428/702; 428/704
(58) Field of Classification Search ................ 428/428, 428/432, 433, 434, 697, 698, 699, 701, 702, 428/704
See application file for complete search history.

(56) References Cited

U.S. PATENT DOCUMENTS

| 5,745,291 | A  |   | 4/1998  | Jenkinson |
| 6,037,289 | A  | * | 3/2000  | Chopin et al. ................... 502/2 |
| 6,312,131 | B1 | * | 11/2001 | Yamamoto et al. .......... 359/507 |
| 2003/0224181 | A1 | * | 12/2003 | Finley et al. ................. 428/432 |

FOREIGN PATENT DOCUMENTS

| EP | 0 901 991 | 3/1999 |
| EP | 1 040 963 | 10/2000 |
| GB | 2 291 653 | 1/1996 |
| JP | 2000 131513 | 5/2000 |
| WO | WO 97/10186 | 3/1997 |

* cited by examiner

*Primary Examiner*—Gwendolyn Blackwell
(74) *Attorney, Agent, or Firm*—Akerman Senterfitt

(57) ABSTRACT

A composite article, in particular, a rear-view mirror for a motor vehicle, comprising a substrate generally made of glass, a reflective layer composed of an oxidized or nitrided metal, possibly in an under-stoichiometric state disposed on either the front face or the rear face, and a coating stack disposed on the front face. The coating stack comprises a layer having generally photocatalytic properties, preferably a titanium dioxide based layer, which may be covered by a fine hydrophilic layer. The coating stack may also comprise a barrier sub-layer. Preferably the hydrophilic layer and barrier sub-layer are composed of silicon oxide. A process for forming the composite article includes sputter deposition of various layers followed by heat treatment. Advantageously the article has an attenuated reflection which can vary between 40% and 75%.

13 Claims, 3 Drawing Sheets

HYDROPHILIC REFLECTIVE ARTICLE

CROSS-REFERENCE TO RELATED APPLICATIONS

This application is the entry into the U.S. National Stage of PCT Application No. PCT/EP2003/50692 filed Oct. 6, 2003, and claims priority from French Application No. 02/12820 filed Oct. 10, 2002, the disclosures of both of which are hereby incorporated by reference.

BACKGROUND

The present invention relates to a reflective article, in particular for the rear-view mirrors for motor vehicles, having hydrophilic properties and an attenuated reflection factor. The present invention also relates to a process for the production of such an article.

Mirrors comprising a metal layer (generally made of silver, aluminum or chromium) applied either to the rear face of a transparent substrate, i.e. on the face remote from the observer, or on the front face of the substrate, thus the face directed towards the observer, are known. With a metal layer of chromium having a thickness in the order of 40 to 60 nm, a light reflection of about 65% is obtained, which is perfectly satisfactory for use as a rear-view mirror. However, with more significant light reflections the rear-view mirror has the disadvantage of causing glare for the driver.

Mirrors with a surface, which has been rendered hydrophilic, are also known (see EP 689 962, EP 1 022 588 or JP 2001033607, for example).

The hydrophilic character of a surface increases its surface energy, which allows drops of water to spread in a film instead of forming droplets. On a non-hydrophilic mirror the rain forms droplets, which obstruct visibility. On a mirror with a hydrophilic surface, the water spreads to form a film to allow better visibility. Various materials are known for their inherent hydrophilic properties, in particular titanium oxide and silicon oxide.

In addition to its hydrophilic properties, titanium oxide, particularly when crystallised in the form of anatase, is also well known for its inherent photocatalytic properties, i.e. it is able to degrade organic matter when stimulated by light or UV irradiation.

Patent applications EP 978 494 and EP 1 099 671 describe anti-fog mirrors comprising a reflective metal film respectively on the rear and front face and a $TiO_2/SiO_2$ coating stack on the front face.

Since the $TiO_2$ layer has a high refractive index (n=2.4), the reflection factor of the coating stack in the visible range is elevated, in the order to 80% for a stack of neutral colouration. To reduce glare, the thicknesses of the layers must be selected so that the wavelength of the reflected light has a peak between 400 and 510 nm, which gives a reflected blue colour and a light reflection in the order of 60%. EP 1 099 671 provides that a reflection-adjusting layer can be added between the reflective film and the $TiO_2$ layer to prevent excessive reduction of the light reflection.

Coating stacks with alternating layers of high and low refractive index are commonly used to increase the light reflection. Documents EP 456 488 and EP 1 040 963 describe mirrors with high light reflection (>70%) using a metal layer as reflective layer, and a succession of low index layers ($SiO_2$) and high index layers ($TiO_2$) to increase reflection.

SUMMMARY

There is a need to provide a reflective article with a photocatalytic and hydrophilic effect to allow good visibility in the case of rain, while maintaining a moderate reflection factor to decrease glare. It must be possible in a simple manner to provide such an article with moderate reflection in neutral reflected tones as well as in coloured tones, e.g. in the blue range.

The aim of the invention is to remedy the disadvantages described above. In particular, an aim of the present invention is to provide a reflective article, which has hydrophilic and photocatalytic properties, and a light reflection, which is maintained at a level of reflection that is not excessive even with a neutral colouration.

DETAILED DESCRIPTION

The subject of the present invention is a composite article comprising a substrate, a reflective layer (generally referred to as reflector) composed of an oxidised or nitrided metal, possibly in an under-stoichiometric state, possibly covered by a barrier layer, then a titanium dioxide-based layer with photocatalytic properties, then possibly a fine porous hydrophilic layer composed in particular of silicon oxide. This surface layer can be discontinuous.

In particular, the reflective layer is a $Cr_xN_y$, wherein x is comprised between 0.67 and 0.9, preferably between 0.7-0.8 and y is comprised between 0.1-0.33, preferably between 0.2-0.3.

Figure 1:
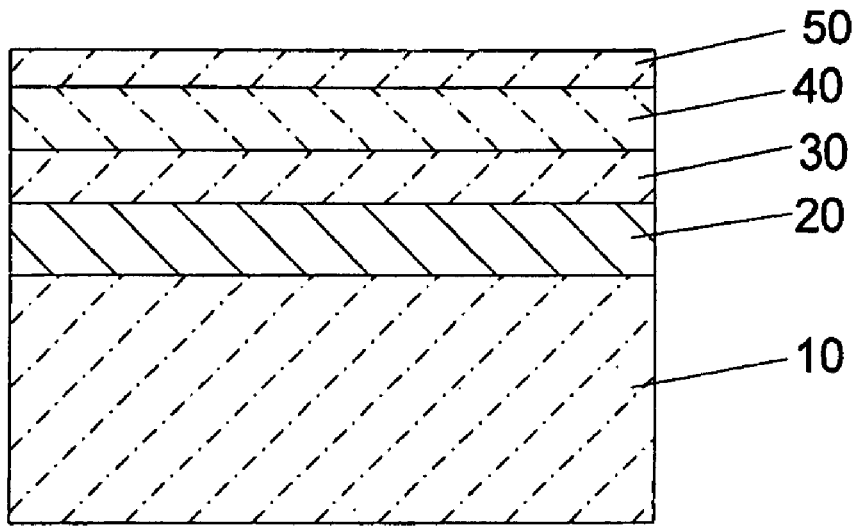
FIG. 1 illustrates one form of a hydrophilic reflective article.
Figure 2:
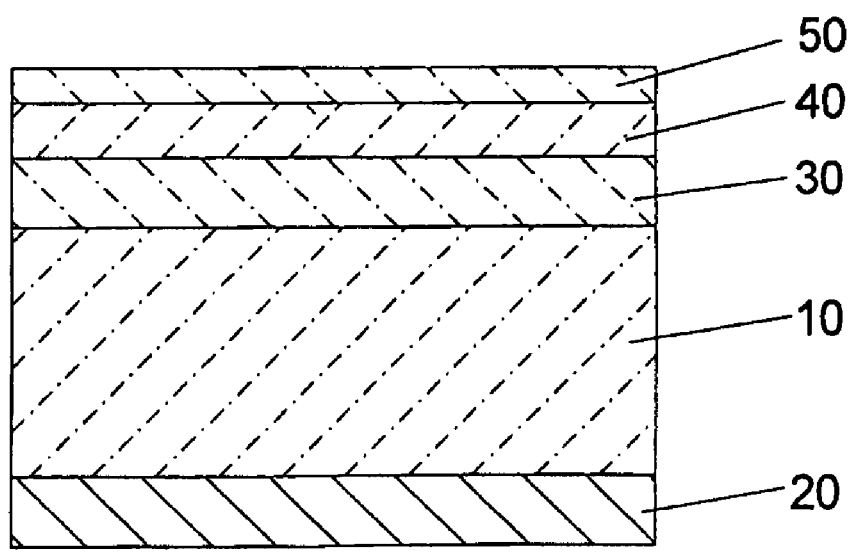
FIG. 2 illustrates another form of a hydrophilic reflective article.

According to an advantageous embodiment shown in FIG. 1, the layers are disposed on the same face of the substrate. However, it is also possible to dispose the reflective layer on the rear face, i.e. on the face remote from the observer, and the photocatalytic layer on the front face, as shown in FIG. 2.

The thickness of the photocatalytic layer can be in the range of between 20 and 120 nm and preferably between 40 and 75 nm. This thickness of the surface layer is itself generally in the range of between 2 and 10 nm and preferably between 3 and 8 nm. This latter layer allows the hydrophilic character of the surface to be preserved for longer after the light irradiation has ceased. The very fine thickness of this outer layer enables the photocatalytic effect of the $TiO_2$ layer to be preserved to some extent.

When a barrier layer is disposed between the reflective layer and the photocatalytic layer, this barrier layer is advantageously composed of silicon oxide. Its thickness can lie between 10 and 80 nm and preferably between 20 and 60 nm. As a result of this barrier layer, the migration of alkaline constituents of the glass, in particular $Na^+$ ions, towards the titanium oxide layer can be reduced or prevented, and also the titanium oxide layer can be separated from the reflector.

The metal of the reflective layer can be selected from titanium, chromium, aluminium, silicon, zirconium and alloys of these metals. Advantageously, the reflective layer is composed of partially oxidised or nitrided chromium. Its thickness can lie between 20 and 150 nm, preferably between 40 and 120 nm.

It is advantageous if the above-described reflective article has a light reflection (integrated over the entire visible range) in the range of between 40 and 75% and preferably between 45 and 70% of the incident visible light.

When the reflected colour of the article according to the invention is neutral (i.e. when the coefficients a* and b* of the Lab system lie between −5 and 5), it is advantageous if the reflection factor lies between 55 and 75%, preferably between 60 and 70%, and when the reflected colour is within the blue range (i.e. a* lies between −10 and 0 and b* is less than −10), it is advantageous if the reflection factor lies between 40 and 55%, preferably between 40 and 50%. The coefficients a* and b* are measured with the illuminant D65 at an angle of incidence of 2°.

The light transmission of the article must be very low and preferably less than 3%, indeed less than 2%.

The present invention also relates to a process for the production of a reflective and hydrophilic article, which comprises the following steps:

the deposit of a lightly oxidised or nitrided metal layer (20) on the front or rear face of a support by cathodic magnetron sputtering in a controlled reactive atmosphere with a metal target;

possibly the deposit of an $SiO_2$ barrier layer on the front face of the support by cathodic magnetron sputtering in a reactive atmosphere with an Si target;

the deposit of a $TiO_2$ layer on the front face by cathodic magnetron sputtering, e.g. in a reactive atmosphere with a Ti target;

thermal treatment at a temperature in the range of between 300 and 500° C., In particular between 350 and 450° C., for a period that may vary from 15 minutes to 6 hours, in particular from 30 minutes to 4 hours, which allows the $TiO_2$ to crystallise in the form of anatase while preventing crazing of the $TiO_2$ and the haze which would result therefrom.

In particular, a process according to the invention also comprises a step of depositing a fine surface layer of $SiO_2$ by magnetron sputtering in a reactive atmosphere with an Si target.

When the reflective layer is disposed on the rear face, this is advantageously deposited first. The barrier and photocatalytic layers and the surface layer are then deposited on the opposite face. The entire covered substrate can then be subjected to a thermal treatment.

The present invention is described below by non-restrictive practical examples.

EXAMPLE 1

A coating stack comprising glass/$Cr_xO_y$/$SiO_2$/$TiO_2$/$SiO_2$ of neutral colouration, as shown in FIG. 1, is formed on a clear soda-lime glass (10) with a thickness of 2 mm by cathodic magnetron sputtering.

The conditions of depositing the different layers forming the stack are as follows:

A first layer (20) of lightly oxidised chromium is deposited on the substrate (10) from a chromium metal target in an atmosphere of 80% by mass of argon and 20% by mass of oxygen. The thickness of the layer is In the order of 45 nm.

A barrier layer (30) of $SiO_2$ is deposited on the first layer from an Si metal target in an atmosphere of 75% by mass of argon and 25% by mass of oxygen. The thickness of the layer is in the order of 40 nm.

A layer of $TiO_2$ (40) is deposited on the barrier layer from an oxidised titanium target in an atmosphere of 75% by mass of argon and 25% by mass of oxygen. The thickness of the layer is in the order of 60 nm.

A last very fine layer of $SiO_2$ (50) is then deposited on the coating stack The deposit is performed from an Si metal target in an atmosphere of 75% by mass of argon and 25% by mass of oxygen. The thickness of the layer is in the order of 5 nm.

The coated substrate Is then subjected to a thermal treatment for 1 hour at 400° C. The rise in temperature occurs rapidly but cooling is conducted very progressively (approximately 3° C. per minute).

Figure 3:
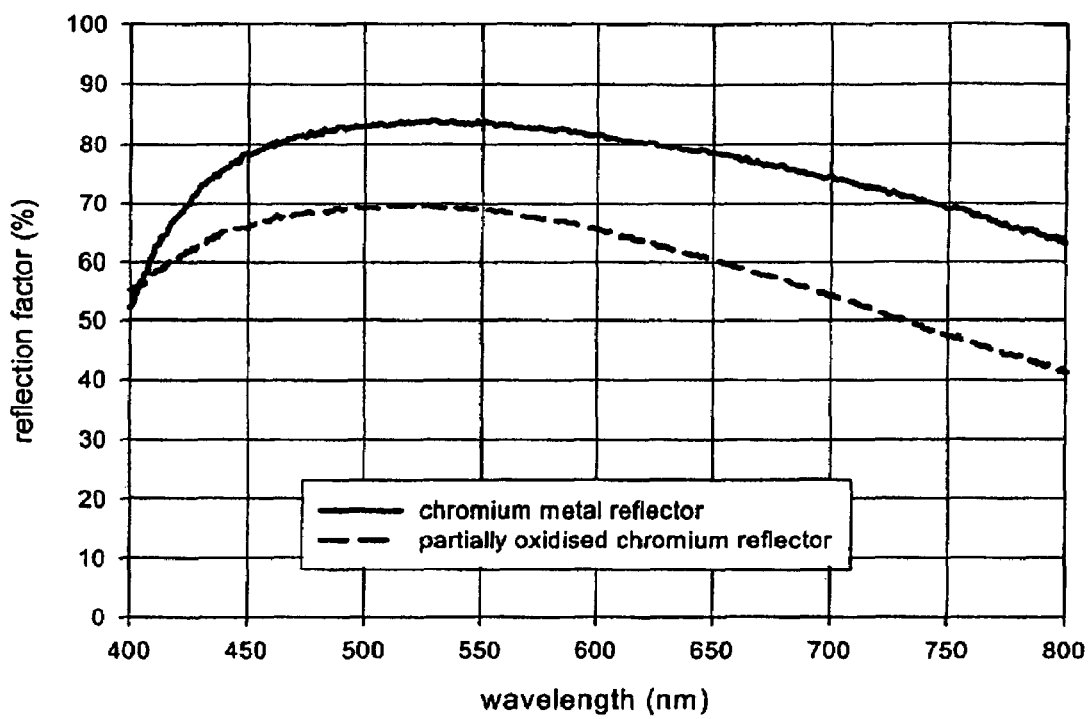
FIG. 3 is a graph of reflection factor as a function of wavelength.

The light reflection factor (LR) integrated over the entire visible range is measured in accordance with the standard SAE J 964 with an integrating photometer. The substrate coated according to Example 1 has a LR of 65%, while the same stack of $SiO_2$/$TiO_2$/$SiO_2$ on a chromium metal layer of the same thickness would have given a LR of 80% and would therefore have given too much glare for use as a rear-view mirror (see FIG. 3).

The reflected colour of the coating stack is determined by the colorimetric coordinates L*, a*, b* on the basis of illuminant D65 with an angle of incidence of 2°. The values obtained are collated in the table below. The very low values for a* and b* show that the coating stack does not have any significant reflected colour.

The light transmission (LT) integrated over the visible range is 0.9%.

EXAMPLE 2

A coating stack comprising glass/$Cr_xN_y$/$SiO_2$/$TiO_2$/$SiO_2$ of blue colouration, as also shown in FIG. 1, is formed on a clear soda-lime glass (10) with a thickness of 2 mm by cathodic magnetron sputtering.

The conditions of depositing the different layers forming the stack are as follows:

A first layer (20) of lightly nitrided chromium is deposited on the substrate from a chromium metal target in an atmosphere of 50% by mass of argon and 50% by mass of nitrogen. The thickness of the layer is in the order of 45 nm.

A barrier layer (30) of $SiO_2$ with a thickness in the order of 25 nm, then a $TiO_2$ layer (40) with a thickness in the order of 40 nm, and then a last layer of $SiO_2$ (50) with a thickness in the order of 5 nm are successively deposited in the same conditions as described in Example 1.

The coated substrate is then subjected to a thermal treatment under the same conditions as described in Example 1.

Figure 4:
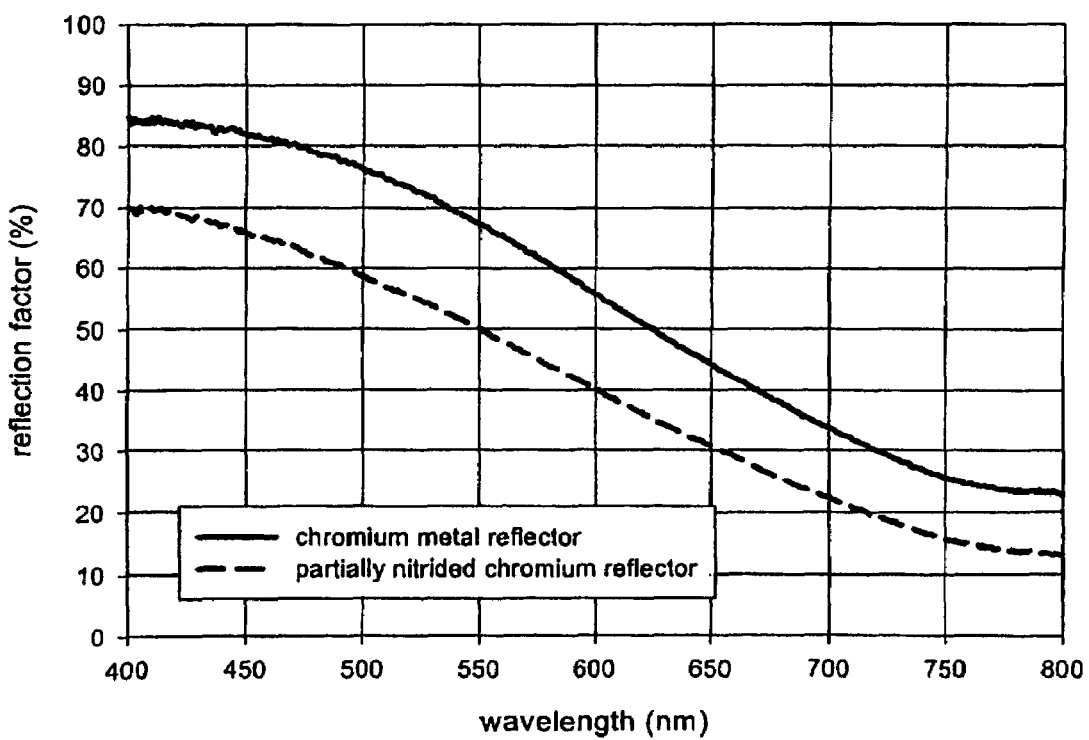
FIG. 4 is a graph of reflection factor as a function of wavelength.

The light reflection factor (LR) integrated over the entire visible range is measured in accordance with the standard SAE J 964 with an Integrating photometer. The substrate coated according to Example 2 has a LR of 43%, while the same coating stack of $SiO_2$/$TiO_2$/$SiO_2$ on a chromium metal layer of the same thickness would have given a LR of 56% (see FIG. 4).

The reflected colour of the coating stack is determined by the colorimetric coordinates L*, a*, b* on the basis of illuminant D65. The values obtained are collated in the table below. The negative values for b* and the very slightly negative values for a* show that the coating stack has a slightly greenish reflected blue colour.

The light transmission (LT) integrated over the visible range is 1.5%.

EXAMPLE 3

A coating stack comprising glass/$Cr_xN_y$/$SiO_2$/$TiO_2$/$SiO_2$ of neutral colour, as also shown in FIG. 1, is formed on a clear soda-lime glass (10) with a thickness of 2 mm by cathodic magnetron sputtering in the same conditions as in example 2.

The thickness of the layers are: 75 nm for the $Cr_xN_y$ layer (20), 55 nm for the $SiO_2$ barrier layer (30), 50 nm for the $TiO_2$ layer (40) and around 5 nm for the $SiO_2$ top layer (50).

The coated substrate is then subjected to a thermal treatment under the same conditions as described in Example 1.

The level of nitridation of the $Cr_xN_y$ layer has been analysed. The index x is evaluated at 0.7 and y at 0.3.

Figure 5:
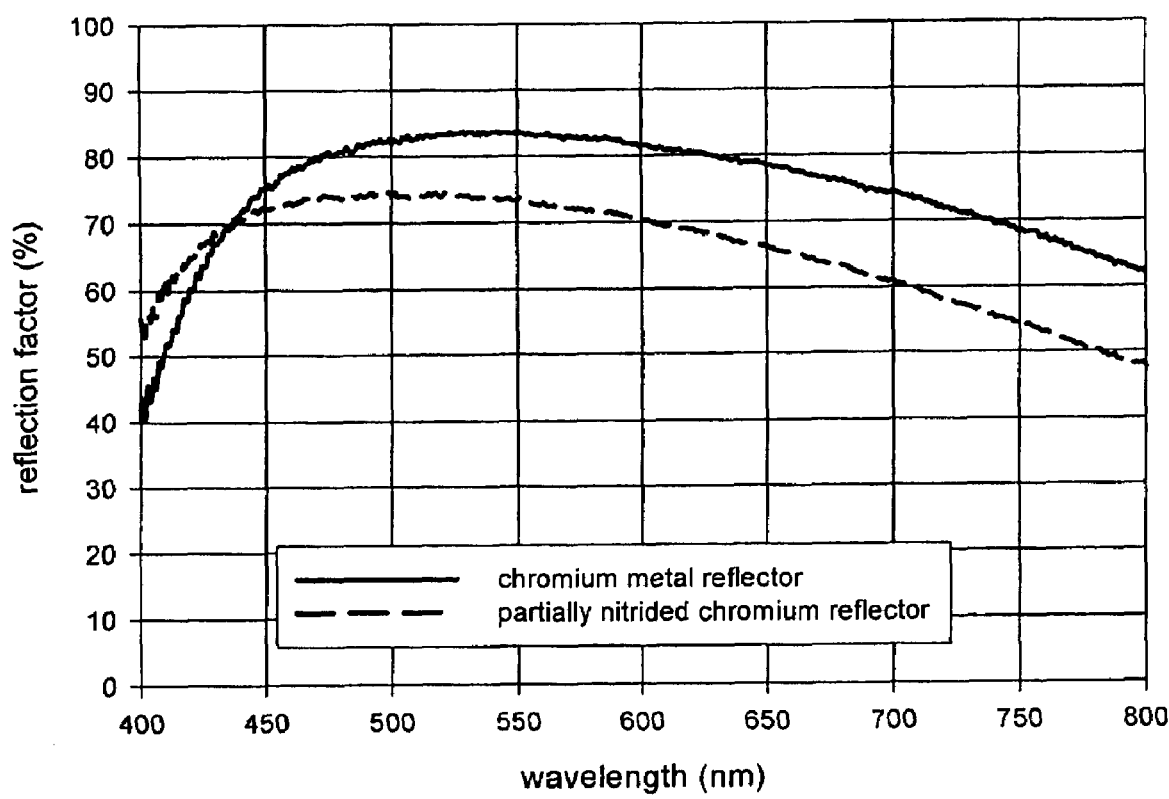
FIG. 5 is a graph of reflection factor as a function of wavelength.

The substrate coated according to Example 3 has a LR of 68%, while the same coating stack of $SiO_2$/$TiO_2$/$SiO_2$ on a chromium metal layer of the same thickness would have given a LR of 76% (see FIG. 5).

The colorimetric coordinates L*, a*, b* of the reflected colour are collated in the table below. The very low values for a* and b* show that the coating stack does not have any significant reflected colour.

TABLE 1

|  | LR | L* | a* | b* |
|---|---|---|---|---|
| Example 1 | 65 | 85.8 | −3.8 | −1.4 |
| Example 2 | 43 | 75.1 | −6.4 | −16.4 |
| Example 3 | 68 | 76 | −3.73 | −2.36 |

The invention claimed is:

1. Composite article comprising a substrate, a reflective layer and a titanium dioxide-based photocatalytic layer, said article being characterized in that the reflective layer is composed of an oxidized or nitrided metal in an under-stoichiometric state such that the total light reflection integrated over the entire visible range of the composite article is in the range of between 40 and 75%.

2. Article according to claim 1, characterized in that its light transmission is less than 3%.

3. Article according to claim 1, characterized by one of the following:
   a) the layers are disposed on the same face of the substrate, or
   b) the reflective layer is disposed on the rear face and the photocatalytic layer is disposed on the front face of the substrate.

4. Article according to claim 1, characterized in that the metal of the reflective layer is selected from Cr, Ti, Al, Si, Zr and the alloys of these metals.

5. Article according to claim 1, characterized in that it comprises at least one of (a) a silicon oxide barrier layer between the photocatalytic layer and the substrate or (b) a silicon oxide surface layer on the front face.

6. Article according to claim 1, characterized by one of the following (a) or (b)
   (a) in that when the reflected colour is neutral (i.e. when the coefficients a* and b* of the Lab system are between −5 and 5), the reflection factor lies
      (i) between 55 and 75%, or
      (ii) between 60 and 72%;
   (b) in that when the reflected colour is within the blue range, (i.e. when the coefficient a* of the Lab system are between −10 and 0 and the coefficient b* of the Lab system is less than −10, the reflection factor lies
      (i) between 40 and 55%, or
      (ii) between 40 and 50%.

7. A composite article according to claim 1 configured as a rear-view mirror of a motor vehicle.

8. Article according to claim 1, characterized by at least one of the following:
   a) a barrier layer between the photocatalytic layer and the substrate, or
   b) a surface layer on the front face, or
   c) the light reflection integrated over the entire visible range lies between 45% and 70%.

9. Article according to claim 8, characterized by any two of a) or b) or c).

10. Article according to claim 8, characterized by all of a) and b) and c).

11. Article according to claim 1, characterized by at least one of the following (a), (b), (c) or (d):
   (a) the reflective layer has a thickness
      (i) in the range of between 20 and 100 nm or;
      (ii) in the range of between 30 and 60 nm;
   (b) the photocatalytic layer has a thickness
      (i) in the range of between 20 and 120 nm or;
      (ii) in the range of between 40 and 75 nm;
   (c) the article comprises a barrier layer between the photocatalytic layer and the substrate, the barrier layer having a thickness
      (i) in the range of between 10 and 80 nm, or;
      (ii) in the range of between 20 and 60 nm;
   (d) the article comprises a surface layer on the front face, the surface layer having a thickness
      (i) in the range of between 2 and 10 nm, or;
      (ii) in the range of between 3 and 6 nm.

12. Article according to claim 11, including at least two of the features (a), (b), (c) or (d).

13. Article according to claim 11, including all of the features (a), (b), (c) and (d).

* * * * *